(12) United States Patent
Perry et al.

(10) Patent No.: US 6,312,476 B1
(45) Date of Patent: *Nov. 6, 2001

(54) PROCESS FOR REMOVAL OF ODORS FROM SILICONES

(75) Inventors: Robert J. Perry, Niskayuna; John A. Kilgour, Clifton Park; Steven B. Dorn, Niskayuna, all of NY (US)

(73) Assignee: General Electric Company, Pittsfield, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/437,962

(22) Filed: Nov. 10, 1999

(51) Int. Cl.[7] ............................... D06L 1/02; B01D 15/00
(52) U.S. Cl. ............................. 8/142; 210/690; 210/916; 556/466
(58) Field of Search ................................ 8/142; 210/690, 210/916; 556/466

(56) References Cited

U.S. PATENT DOCUMENTS

| | | |
|---|---|---|
| 3,203,754 | 8/1965 | Young et al. . |
| 3,309,166 | 3/1967 | Moncada et al. . |
| 3,658,459 | 4/1972 | Gartlan . |
| 3,755,152 * | 8/1973 | Gulick . |
| 4,661,612 | 4/1987 | George et al. . |
| 4,774,346 | 9/1988 | Imai et al. . |
| 5,118,764 | 6/1992 | Ichinohe et al. . |
| 5,225,509 | 7/1993 | Heinrich et al. . |
| 5,238,899 | 8/1993 | Kadowaki et al. . |
| 5,245,067 | 9/1993 | Schneider et al. . |
| 5,288,831 | 2/1994 | Ichinohe et al. . |
| 5,942,007 * | 8/1999 | Berndt et al. . |

FOREIGN PATENT DOCUMENTS

| | | |
|---|---|---|
| 3940804 A1 | 6/1991 | (DE) . |
| 0 543 665 A1 | 5/1993 | (EP) . |

* cited by examiner

*Primary Examiner*—Margaret Einsmann

(57) ABSTRACT

A process for removing malodorous elements from silicone dry cleaning solvents, comprising contacting the used silicone solvent with adsorbent to remove the odor, and separating the silicone solvent.

11 Claims, No Drawings

PROCESS FOR REMOVAL OF ODORS FROM SILICONES

TECHNICAL FIELD

The present invention is directed to a process, more specifically, to a process for removing malodorous elements from silicone dry cleaning solvents.

BACKGROUND

Current dry cleaning technology uses perchloroethylene ("PERC") or petroleum-based materials as the cleaning solvent. PERC suffers from toxicity and odor issues. The petroleum-based products are not as effective as PERC in cleaning garments. Volatile siloxanes are being introduced into the dry cleaning industry as an alternative to PERC. However, undesirable odors are sometimes carried over with the siloxane solvent, so there exists a need to remove the odor from the siloxane solvent.

Methods for the purification of organopolysiloxanes have previously been reported as utilizing elemental metals (see U.S. Pat. No. 5,245,067). Other patents disclose the purification of polyether silicones by contacting with an aqueous acid and removing the malodorous materials formed (see U.S. Pat. No. 5,118,764), or the reaction with hydrogen and a hydrogenation catalyst (see U.S. Pat. No. 5,225,509). Hexamethyldisiloxane has been purified by successive treatments with a condensation catalyst, washing with water, separating the phases, distilling the siloxane, treating with acid clay and then treating with activated carbon (see U.S. Pat. No. 4,774,346). Siloxanes have also been purified by contacting with steam and distilling out the impurities (see EP 543 665). A deodorization method utilizing active carbon to which a functional group has been fixed through a silanol bond has been reported (see U.S. Pat. No. 5,238,899). Finally, a method was reported for purifying silicone oil by adding a drying agent and an adsorption agent to silicone and passing a low water vapor inert gas through the system (see U.S. Pat. No. 4,661,612).

There is a need for a method for removing unwanted odors in a volatile siloxane used in dry cleaning applications.

SUMMARY OF THE INVENTION

In a first aspect, the present invention is directed to a method for removing malodorous elements from silicone dry cleaning solvents, comprising contacting the silicone solvent with adsorbent to remove the malodorous elements, and separating the silicone solvent.

The process of the present invention is effective in removing or reducing malodorous elements, such as for example, propionic acid, propionaldehyde, butyric acid and butyraldehyde, from the silicone solvent.

DETAILED DESCRIPTION OF THE INVENTION

Preferably, the first preferred embodiment of the method of the present invention comprises, contacting a silicone dry cleaning solvent that may contain malodorous elements with an adsorbent, removing the malodorous elements, and separating the silicone solvent. Preferably, the silicone dry cleaning solvent is a volatile linear, branched, cyclic or a combination thereof, siloxane.

Compounds suitable as the adsorbent are those that effectively remove the malodorous components of the siloxane solvent. Examples of adsorbents suitable for use include, but are not limited to, silica gel, fullers earth, alumina, diatomaceous earth, magnesium silicate, granular activated carbon, molecular sieves, powdered decolorizing charcoal, magnesium sulfate, corn cob powder, zeolites, and clays. Preferably, the adsorbent is granular activated carbon, 4A molecular sieves, or 13X molecular sieves.

Compounds suitable as the linear or branched, volatile siloxane solvent of the present invention are those containing a polysiloxane structure that includes from 2 to 20 silicon atoms. Preferably, the linear or branched, volatile siloxanes are relatively volatile materials, having, for example, a boiling of below about 300° C. point at a pressure of 760 millimeters of mercury ("mm Hg").

In a preferred embodiment, the linear or branched, volatile siloxane comprises one or more compounds of the structural formula (I):

$$M_{2+y+2z}D_xT_yQ_z \qquad (I)$$

wherein:

M is $R^1{}_3SiO_{1/2}$;

D is $R^2{}_2SiO_{2/2}$;

T is $R^3SiO_{3/2}$;

and Q is $SiO_{4/2}$ $R^1$, $R^2$ and $R^3$ are each independently a monovalent hydrocarbon radical; and x and y are each integers, wherein $0 \leq x \leq 10$ and $0 \leq y \leq 10$ and $0 \leq z \leq 10$.

Suitable monovalent hydrocarbon groups include acyclic hydrocarbon radicals, monovalent alicyclic hydrocarbon radicals, monovalent and aromatic hydrocarbon radicals. Preferred monovalent hydrocarbon radicals are monovalent alkyl radicals, monovalent aryl radicals and monovalent aralkyl radicals.

As used herein, the term "($C_1$–$C_6$)alkyl" means a linear or branched alkyl group containing from 1 to 6 carbons per group, such as, for example, methyl, ethyl, propyl, isopropyl, n-butyl, iso-butyl, sec-butyl, tert-butyl, pentyl, hexyl, preferably methyl.

As used herein, the term "aryl" means a monovalent unsaturated hydrocarbon ring system containing one or more aromatic rings per group, which may optionally be substituted on the one or more aromatic rings, preferably with one or more ($C_1$–$C_6$)alkyl groups and which, in the case of two or more rings, may be fused rings, including, for example, phenyl, 2,4,6-trimethylphenyl, 2-isopropylmethylphenyl, 1-pentalenyl, naphthyl, anthryl, preferably phenyl.

As used herein, the term "aralkyl" means an aryl derivative of an alkyl group, preferably a ($C_2$–$C_6$)alkyl group, wherein the alkyl portion of the aryl derivative may, optionally, be interrupted by an oxygen atom, such as, for example, phenylethyl, phenylpropyl, 2-(1-naphthyl)ethyl, preferably phenylpropyl, phenyoxypropyl, biphenyloxypropyl.

In a preferred embodiment, the monovalent hydrocarbon radical is a monovalent ($C_1$–$C_6$)alkyl radical, most preferably, methyl.

In a preferred embodiment, the linear or branched, volatile siloxane comprises one or more of, hexamethyldisiloxane, octamethyltrisiloxane, decamethyltetrasiloxane, dodecamethylpentasiloxane, tetradecamethylhexasiloxane or hexadecamethylheptasiloxane or methyltris(trimethylsiloxy)silane. In a more highly preferred embodiment, the linear or branched, volatile siloxane of the present invention comprises octamethyltrisiloxane, decamethyltetrasiloxane, or dodecamethylpentasiloxane or methyltris(trimethylsiloxy)silane. In a highly preferred embodiment, the siloxane component of the composition of the present invention consists essentially of decamethyltetrasiloxane.

Suitable linear or branched volatile siloxanes are made by known methods, such as, for example, hydrolysis and condensation of one or more of tetrachlorosilane, methyltrichlorosilane, dimethyldichlorosilane, trimethylchlorosilane, or by isolation of the desired fraction of an equilibrate mixture of hexamethyldisiloxane and octamethylcyclotetrasiloxane or the like and are commercially available.

Compounds suitable as the cyclic siloxane component of the present invention are those containing a polysiloxane ring structure that includes from 2 to 20 silicon atoms in the ring. Preferably, the linear, volatile siloxanes and cyclic siloxanes are relatively volatile materials, having, for example, a boiling point of below about 300° C. at a pressure of 760 millimeters of mercury ("mm Hg").

In a preferred embodiment, the cyclic siloxane component comprises one or more compounds of the structural formula (II):

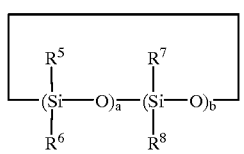

(II)

wherein:
R$^5$, R$^6$, R$^7$ and R$^8$ are each independently a monovalent hydrocarbon group; and
a and b are each integers wherein $0 \leq a \leq 10$ and $0 \leq b \leq 10$, provided that $3 \leq (a+b) \leq 10$.

In a preferred embodiment, the cyclic siloxane comprises one or more of, octamethylcyclotetrasiloxane, decamethylcyclopentasiloxane, dodecamethylcyclohexasiloxane, tetradecamethylcycloheptasiloxane. In a more highly preferred embodiment, the cyclic siloxane of the present invention comprises octamethylcyclotetrasiloxane or decamethylcyclopentasiloxane. In a highly preferred embodiment, the cyclic siloxane component of the composition of the present invention consists essentially of decamethylcyclopentasiloxane.

Suitable cyclic siloxanes are made by known methods, such as, for example, hydrolysis and condensation of dimethyldichlorosilane and are commercially available.

In a first embodiment of the method of the present invention, approximately 100 parts by weight ("pbw") of siloxane solvent contacts up to about 100, more preferably up to about 50, even more preferably up to about 25 pbw of adsorbent for about 0.1 to about 6 hours, more preferably from about 0.1 to about 2 hours, even more preferably from about 0.1 to about 0.5 hours at a temperature of from about 10 to about 100° C., more preferably from about 20 to about 60° C. in a batch mode.

In an alternative preferred embodiment of the present invention, siloxane solvent contacts a bed of adsorbent at a rate sufficient to provide efficient adsorption of the undesirable malodorous elements in a continuous mode, preferably at a ratio of from about 1 pbw siloxane solvent to about 1 pbw adsorbent (1:1), to about 10 pbw siloxane solvent to about 1 pbw adsorbent (10:1).

After the siloxane solvent has contacted the adsorbent for the appropriate time and the malodorous have been removed, the siloxane solvent can be recycled in the dry cleaning apparatus. The process of the present invention is effective in reducing the level of malodorous elements in the silicone solvent.

In a second embodiment of the process of the present invention, a dry cleaning fluid is treated by the process of the present invention.

The process of the present invention also comprises a dry cleaning process comprising the steps of: contacting an article with a silicone solvent, and removing the silicone solvent, then treating the silicone solvent that has been removed by contacting the silicone solvent with an adsorbent, and separating the silicone solvent from the adsorbent, then reusing the treated silicone solvent in the dry cleaning process.

The following examples illustrate the process of the present invention. They are illustrative and the claims are not to be construed as limited to the examples.

EXAMPLE 1

Cyclic siloxane (D$_5$) that was used as a dry cleaning solvent and had been reclaimed was treated to remove the odors. Approximately 100 grams of used siloxane solvent with odors was mixed with 25 grams of different adsorbents to form a slurry. The slurry was mixed for 6 hours at ambient temperature. The adsorbent was removed by filtration and the siloxane solvent evaluated olfactorally to determine the efficacy of the purification method. The results and adsorbents used are shown in Table 1 below.

The following adsorbents were used throughout the examples:

| Adsorbent Number | Type of Adsorbent |
|---|---|
| A | Diatomaceous earth (Celite ® 545) |
| B | 4A molecular sieves |
| C | 13X molecular sieves |
| D | silica gel 60-200 mesh |
| E | granular activated carbon |
| F | acid clay |
| G | NaHCO$_3$ |
| H | Na$_2$CO$_3$ |
| I | fullers earth |
| J | Powdered decolorizing charcoal (Norit ®) |
| K | Powdered 13X molecular sieves |

TABLE 1

Odor Removal from Cyclic Siloxane - Long Contact Time

| Exp. # | Adsorbent | Odor 1 | Odor 2 | Odor 3 | Average Rating |
|---|---|---|---|---|---|
| 1 | None | 1 | 1 | 1 | 1 |
| 2 | A | 1 | 1 | 2 | 1.3 |
| 3 | B | 3.5 | 4.5 | 4 | 4 |
| 4 | C | 4.5 | 4 | 5 | 4.5 |
| 5 | D | 3 | 2 | 3 | 2.7 |
| 6 | E | 5 | 5 | 5 | 5 |
| 7 | F | 1 | 1 | 2 | 1.3 |
| 8 | G | 1 | 1 | 1 | 1 |
| 9 | H | 1 | 1 | 1 | 1 |
| 10 | I | 2.5 | 2 | 3 | 2.5 |

The rating scale was as follows:
1 = no change
2 = small improvement
3 = some odor still present
4 = almost odorless
5 = no odor Table 1 shows that 4A and 13X molecular sieves and granular activated carbon effectively removed the odors in the siloxane solvent.

EXAMPLE 2

A second set of experiments was run with a decreased contact time and a simulated in-line purification method. Used siloxane dry cleaning solvent was passed through a glass tube (approximately ½ inch diameter) containing various adsorbents. The purified siloxane solvent was again evaluated olfactorally to determine the efficacy of the purification method. The results and adsorbents used are shown in Table 2 below.

TABLE 2

Odor Removal from Siloxane Solvent - Short Contact Time

| Exp. # | Adsorbent | Amount of Adsorbent | Amount of Siloxane | Contact Time (minutes) | Odor |
|---|---|---|---|---|---|
| 11 | E | 58 grams | 200 grams | 10 | 5 |
| 12 | J | 12 grams (with 24 grams filter aid) | 200 grams | 30 | 5 |
| 13 | B | 35 grams | 200 grams | 10 | 5 |

The same rating scale was used as in Example 1.

EXAMPLE 3

A similar experiment to that run in Example 1 was completed, substituting a linear siloxane solvent ($MD_2M$) for the cyclic siloxane. A sample of $MD_2M$ was spiked with 10% of $D_5$ containing the malodorous elements. Table 3 shows the results of treating 200 g $D_5$ that was spiked with various odors (propionaldehyde (0.0145 g), propionic acid (0.0330 g), butyraldehyde (0.0210 g) and butyric acid (0.0353 g)) and then analyzing the samples olfactorally and via GC. Approximately 40 grams of linear siloxane solvent spiked with odors was mixed with 10 grams of different adsorbents to form a slurry. The slurry was mixed for 6 hours at ambient temperature. The absorbent was removed by filtration and the siloxane solvent evaluated olfactorally to determine the efficacy of the purification method. The results and absorbents used are shown in Table 3 below.

TABLE 3

Odor Removal from Linear Siloxane Solvent

| Exp. # | Adsorbent | Amount of Adsorbent | Amount of Siloxane | Contact Time (hours) | Odor |
|---|---|---|---|---|---|
| 14 | E | 10 grams | 40 grams | 6 | 3.3 |
| 15 | J | 10 grams | 40 grams | 6 | 4.7 |
| 16 | B | 10 grams | 40 grams | 6 | 2.7 |
| 17 | C | 10 grams | 40 grams | 6 | 4.3 |
| 18 | D | 10 grams | 40 grams | 6 | 3.0 |
| 16 | "smelly" $MD_2M$ solvent (control) | none | 40 grams | — | 1.0 |

The same rating scale was used as in Example 1.

The same rating scale was used as in Example 1.

EXAMPLE 4

Pure $D_5$ was spiked with various components (as shown in Table 4). Samples were run through adsorbents (10% adsorbent loading for 1 minute contact time). The samples were analyzed by GC to determine the efficacy of odor removal. Results are shown in Table 4.

TABLE 4

Analysis of Spiked $D_5$ Samples

| Exp. # | Adsorb. | Propion-aldehyde | Propionic acid | Butyr-aldehyde | Butyric acid | Odor |
|---|---|---|---|---|---|---|
| 17 | None | 73 ppm | 165 ppm | 105 ppm | 176 ppm | 1 |
| 18 | J | <10 ppm | <10 ppm | <10 ppm | <10 ppm | 4 |
| 19 | C | <10 ppm | <10 ppm | <10 ppm | <10 ppm | 4 |
| 20 | F | 9 ppm | 46 ppm | 31 ppm | 53 ppm | 3 |

The same rating scale as in Example 1 was used to determine the odor value.

The same rating scale as in Example 1 was used to determine the odor value.

The results were obtained from GC/MS data and are reported in ppm and compared to the original loading of the control sample. The powdered decolorizing charcoal and the powdered 13X molecular sieves removed essentially all the contaminants as seen by GC/MS. The same conclusion was also determined olfactorally with a value of 4 on the odor scale. The granular activated carbon was less effective, getting a 3 on the odor scale and showing some residual acids and aldehydes remaining after treatment.

What is claimed is:

1. A process for removing malodorous elements from a silicone dry cleaning solvent, comprising contacting the silicone solvent with an adsorbent in an amount of from about one part by weight solvent to one part by weight adsorbent (1:1) to about ten parts by weight solvent to one part by weight adsorbent (10:1) for a period of time effective to remove the malodorous elements, wherein the adsorbent is selected from the group consisting of 4A molecular sieves and 13X molecular sieves, and separating the silicone solvent from the absorbent.

2. The process of claim 1, wherein the process is a batch process.

3. The process of claim 1, wherein the process is a continuous process.

4. The process of claim 3, wherein the solvent contacts the adsorbent for about 0.1 to about 6 hours.

5. The process of claim 2, wherein the solvent contacts the adsorbent for about 0.1 to about 6 hours.

6. The process of claim 2, wherein the solvent contacts the adsorbent at a temperature of from about 10 to about 100° C.

7. The process of claim 3, wherein the solvent contacts the adsorbent at a temperature of from about 10 to about 100° C.

8. The process of claim 1, wherein the solvent is a linear or branched, volatile siloxane solvent of the formula:

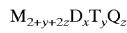

$$M_{2+y+2z}D_xT_yQ_z$$

wherein:

M is $R^1{}_3SiO_{1/2}$;

D is $R^2{}_2SiO_{2/2}$;

T is $R^3SiO_{3/2}$;

and Q is $SiO_{4/2}$ $R^1$, $R^2$ and $R^3$ are each independently a monovalent hydrocarbon radical; and x and y are each integers, wherein 0≦x≦10 and 0≦y≦10 and 0≦z≦10.

9. The process of claim 1, wherein the solvent is a cyclic siloxane of the formula:

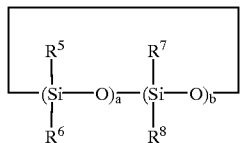

wherein:

$R^5$, $R^6$, $R^7$ and $R^8$ are each independently a monovalent hydrocarbon group; and a and b are each integers wherein 0≦a≦10 and 0≦b≦10, provided that 3≦(a+b)≦10.

10. The process of claim 9, wherein the cyclic siloxane consists essentially of decamethylcyclopentasiloxane.

11. The process of claim 1, wherein the malodorous elements removed from the solvent are propionic acid, propionaldehyde, butyric acid or butyraldehyde.

* * * * *